(12) United States Patent
Yamada

(10) Patent No.: US 6,330,002 B1
(45) Date of Patent: Dec. 11, 2001

(54) IMAGE COLOR BLENDING PROCESSOR

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/274,399

(22) Filed: Mar. 23, 1999

(30) Foreign Application Priority Data

Mar. 27, 1998 (JP) .................................................. 10-098171

(51) Int. Cl.$^7$ .................................................. G06T 11/60
(52) U.S. Cl. .......................................... 345/629; 345/634
(58) Field of Search .................................. 345/435, 426, 345/629

(56) References Cited

U.S. PATENT DOCUMENTS

| | | | |
|---|---|---|---|
| 4,698,682 | 10/1987 | Astle | 358/182 |
| 5,068,665 | 11/1991 | Piazza et al. | 342/177 |
| 5,625,764 | 4/1997 | Tsujimoto et al. | 395/135 |

FOREIGN PATENT DOCUMENTS

| | | |
|---|---|---|
| 61-159690 | 7/1986 | (JP) . |
| 5224623 | 9/1993 | (JP) . |
| 7123322 | 5/1995 | (JP) . |
| 9102909 | 4/1997 | (JP) . |
| 10333657 | 12/1998 | (JP) . |
| WO9424815 | 10/1994 | (WO) . |

OTHER PUBLICATIONS

European Search Report issued Aug. 16, 2000 in a related application (in English).

Office Action Issued by the Japanese Patent Office in the Corresponding Japanese Application on Mar. 2, 1999 and an English Translation Thereof.

*Primary Examiner*—Jeffery Brier
*Assistant Examiner*—Motilewa Good-Johnson
(74) *Attorney, Agent, or Firm*—Ostrolenk, Faber, Gerb & Soffen, LLP

(57) ABSTRACT

An image color blending processor which does not need any multiplication in an image processing to achieve a semi-transparent display and a scaled up display is provided. A small region is constituted of plural pixels adjacent to each other. In each display frame, pixel data of a background image is displayed for a predetermined number of pixels and pixel data of a superimposing image is displayed in the other pixels in the small region in sequence. In the 200% scaled up image in the vertical direction, as an interpolating line, in each display frame, one of the above and below pixel values of the original image is selected alternately and displayed.

6 Claims, 7 Drawing Sheets

F I G. 4
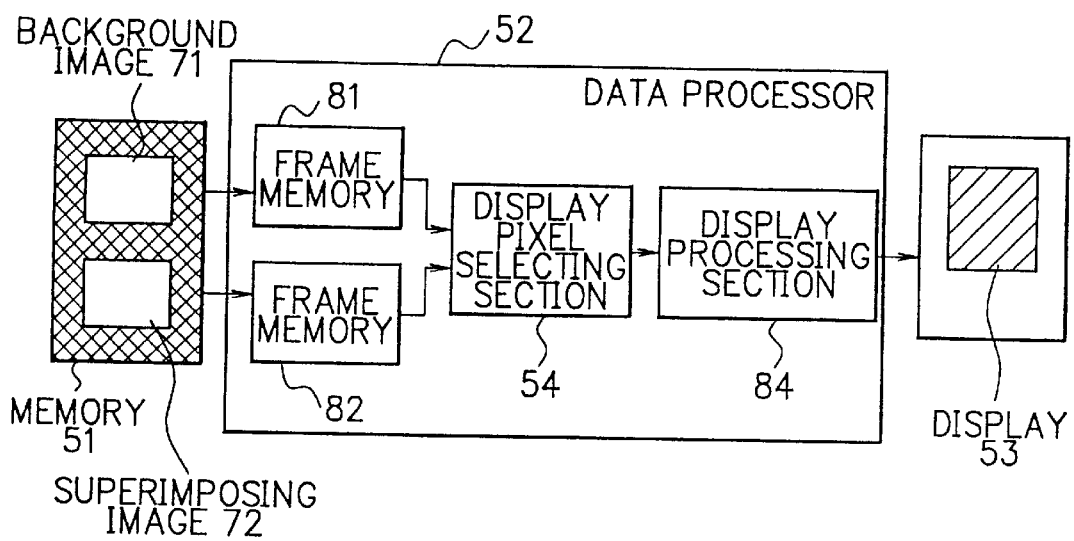
F I G. 5
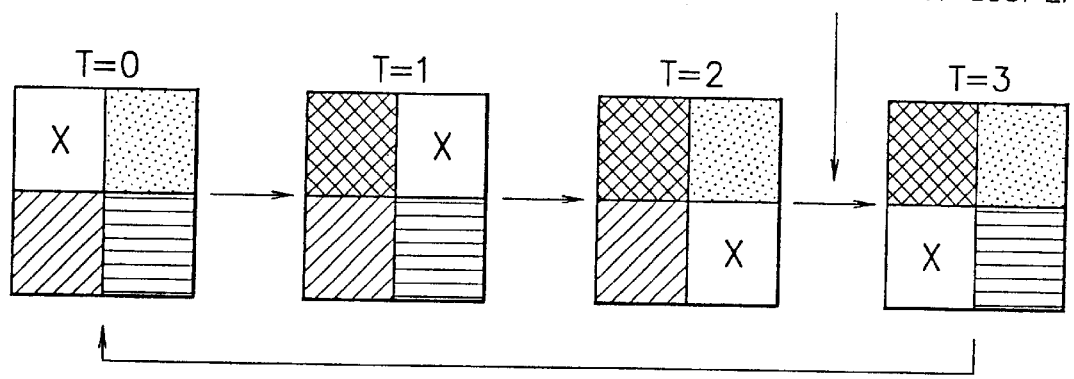

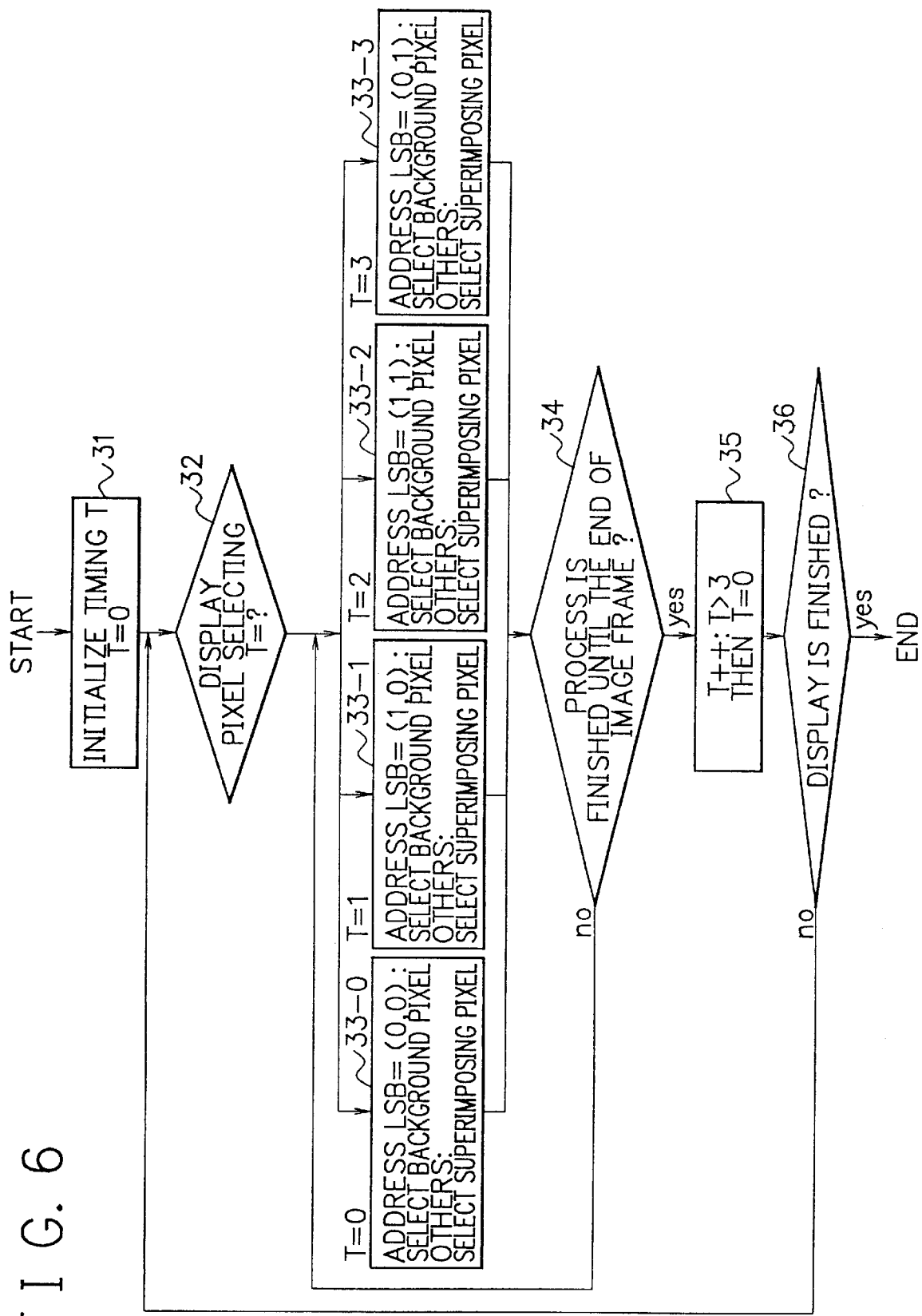
F I G. 6

IMAGE COLOR BLENDING PROCESSOR

BACKGROUND OF THE INVENTION

The present invention relates to an image color blending processor which in particular implements semitransparent display such that two images are superimposed and the back image is able to be seen through the front image, and implements a color blending process of interpolating pixels when upscaling the display of the images.

DESCRIPTION OF THE RELATED ART

To achieve the semitransparent display of images, the color blending process called a blending has been well known. The α blending is a method to make a composite image of two images, and a method which creates the appearance of the background image being seen through the superimposing image when one image is a superimposing image and the other image is a background image. When one pixel data of a color image is composed of each digital element of R, G, B indicating the luminance of the pixel, the a blending processes, $S[R, G, B] = \alpha F[R, G, B] + (1-\alpha)H[R, G, B]$.

In this, α is a numerical value representing the degree of the transparency and is called an alpha value. $F[R, G, B]$ is the data of each color of one pixel of the superimposing image, $H[R, G, B]$ is the data of each color of one pixel of the background image existing at the same place as the pixel of the superimposing image and $S[R, G, B]$ is the data of each color of the composite pixel. $\alpha=0$ means perfect transparency and $\alpha=1$ means perfect opacity; therefore, $0<\alpha<1$.

FIG. 1 is a block diagram showing the construction of the process of the α blending. In FIG. 1, a background image 11 and a superimposing image 12 are together expressed as the image data stored in a memory 1. A frame memory 21 is in a data processor 2 and stores one frame of the background image which is read from the background image 11 in sequence and a frame memory 22 is in the data processor 2 and stores one frame of the superimposing image which is read from the superimposing image 12 in sequence.

Reading from the frame memory 21 and the frame memory 22 and writing to a frame memory for display 23 are implemented by a common address signal.

A superimposing pixel value read from the frame memory 22 is multiplied by the value a at a multiplier 66 and a background pixel value read from the frame memory 21 is multiplied by the value $(1-\alpha)$ at a multiplier 65 and the outputs from the multipliers 65 and 66 are added at an adder 67 and are inputted to the frame memory for display 23, and the data from the frame memory for display 23 is read and shown on a display 3.

As mentioned above, in the a blending process, an arbitrary value can be selected for the value a showing the degree of transparency. However, there is a problem in that a large quantity of calculation is needed when the multipliers 65 and 66 are obtained using software, because this process is implemented at the time of data transfer to the frame memory, and the display speed of the image is influenced by the throughput of the display. Thus, the problem is that a fully smooth color blending process cannot be implemented when a real time process such as regenerating animation is needed.

The Japanese Patent Application Laid-Open No. SHO 61-159690 discloses a method in which the α blending is not applied for the pixel values of the superimposing image and background image, and the pixels of the superimposing image are thinned out at a certain ratio and superimposed on the background image, and the semitransparent display is implemented artificially. However, by thinning out the pixels of the superimposing image simply, for example, along a line having with a width of one pixel in the image, there is a problem in that portions of the line either does not appear or appears as a coarse dotted line even though the line is actually being displayed.

This kind of color blending process is applied for not only the semitransparent display of the superimposing image but also the up scaling of images. As an example, the case in which an image is up scaled twice in the vertical direction is explained. In this case, the same data is displayed in two lines, but the natural appearance of the image is lost. Therefore, an interpolating process is implemented.

FIG. 2 is a diagram showing a part of a frame memory for the image data to be up scaled in the vertical direction. In FIGS. 2, A, B, C and D are each shown as one line of memory. FIG. 3 is a flowchart showing the scale up process of the conventional type. For example, in the case that a line AB is interpolated between a line A and a line B (the "yes" response at step 90), the data of one pixel of one line (for example line A) of the image to be up scaled is taken out (step 91). The data of one pixel of the next line (for example line B) is taken out, wherein this pixel is at the same horizontal position as the pixel taken out from the line A (step 92). Then, an average value of the two pixels taken out is calculated (step 93). That is, the a blending is implemented as $\alpha=\frac{1}{2}$. This average value is inserted in between lines as a pixel value of the line AB and the interpolation is implemented. This interpolation process is implemented in every two lines and the up scaled image in the vertical direction is obtained (step 90 and steps 96 to 100).

In this case, a color blending calculation is also needed (step 93) in the above mentioned example in which the average value is interpolated every two lines and the 200% up scale in the vertical direction is implemented. However, in the case of a 300% up scale, a blending using a suitable a value is needed in order to implement a smooth interpolating process, which creates a problem in that a big burden is loaded to the process.

SUMMARY OF THE INVENTION

It is therefore an object of the present invention to provide an image color blending processor in which an a blending process does not place a big burden on the processor and which is able to filly implement a color blending in high quality and in real time even in a processor of small throughput.

In order to solve the above mentioned problems, the present invention provides an image color blending processor which utilizes the characteristic of the sense of sight and is able to implement a semitransparent display and an up scale display in a simple processor.

According to a first aspect of the present invention, for achieving the above mentioned objects, an image color blending processor, which displays a second original image superimposed semitransparently on a first original image, provides a display pixel selecting section which divides a display image into plural small regions constituted of a definite number of pixels adjacent to each other, and refers to the timing and display address of a display frame for the respective small regions in each display frame of said display image, and selects in sequence a pixel data of small regions of said first original image and a pixel data of said small regions of said second original image at a defined rate, by making the selecting rate of each pixel uniform in time and space, and a display processing section which generates a display image signal based on the pixel data selected at said display pixel selecting section.

According to the second aspect of the present invention, in the first aspect, said small region is constituted of at least 4 adjacent pixels.

According to a third aspect of the present invention, in the first aspect, an image color blending processor provides a first frame memory for developing said first original image, a second frame memory for developing said second original image and a timing counter for incrementing in a cycle a counting value of from 0 to 3 while synchronizing a vertical synchronizing signal of said display image.

According to a fourth aspect of the present invention, in the first aspect, said display pixel selecting section selects a pixel data corresponding to either the display address of said first frame memory or of said second frame memory, according to the combination of the respective LSB (least significant bit) values when the X address and Y address of said display addresses are expressed in the binary digit and said counting value, at the superimposing display region.

Without needing any multiplication such as the a blending which loads a big burden on the processor, for example with the color blending factor 3 to 1 or 1 to 1 or 1 to 3, an image is able to be superimposed semitransparently at high speed and with ease.

According to a fifth aspect of the present invention, an image color blending processor, which displays an original image up scaled by interpolating a definite number of pixels in the vertical direction or horizontal direction or both the vertical and horizontal directions between the pixels of the original image, provides a display pixel selecting section which refers to the timing and display address of the display frame in each display frame of the up scaled display image and selects in sequence any pixel data of the pixel value of the original image displayed at the nearest address to the right and left and above and below the respective pixel data as the respective pixel values to be interpolated at a definite rate, by making the average time of the respective pixel values change smoothly in the space between the pixels of said original image adjacent to pixels to be interpolated, and a display processing section which generates a display image signal based on the pixel data selected at the display pixel selecting section.

According to the sixth aspect of the present invention, in the fifth aspect, said up scaled display image is a twice up scaled image in the vertical direction which is obtained by interpolation in which 1 line of pixels are interpolated every 2 lines to the original image data in the vertical direction, and said display pixel selecting section which alternately selects the pixel data of the interpolating line from the pixel data of said original image line displayed right above said interpolating line and right below said interpolating line in each display frame.

Therefore, without needing the multiplication and averaging process of the pixel values which is a big burden for the processor, viewers are able to see that the pixel value changes smoothly as a linear interpolation. Therefore, the image can be displayed after being up scaled without any loss in the natural appearance.

BRIEF DESCRIPTION OF THE DRAWINGS

The objects and features of the present invention will become more apparent from the consideration of the following detailed description taken in conjunction with the accompanying drawings in which:

FIG. 4 is a block diagram showing a first embodiment of the present invention;

FIG. 5 is a conceptual diagram showing an explanation of the superimposing of adjacent pixels with each other in each display frame at the displaying image on the display;

FIG. 6 is a flowchart showing a selecting process of the pixel value;

DESCRIPTION OF THE PREFERRED EMBODIMENTS

Figure 1:
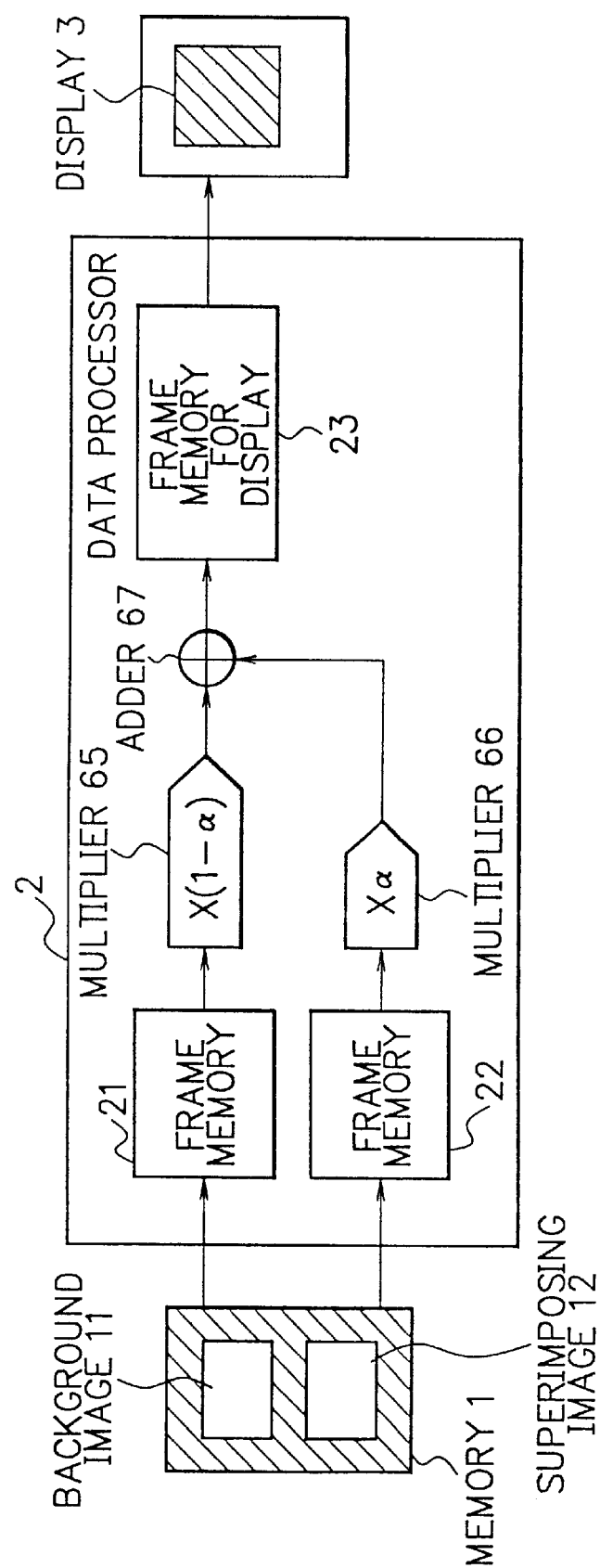
FIG. 1 is a block diagram showing the construction of the process of the a blending.
Figure 2:
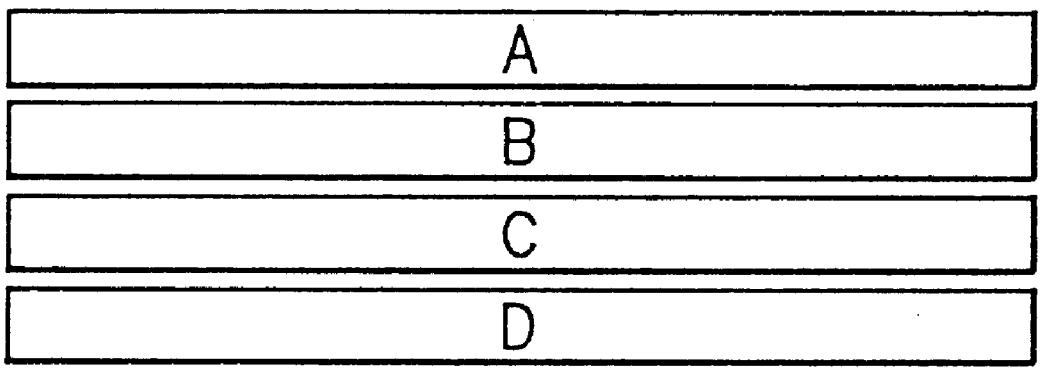
FIG. 2 is a diagram showing a part of a frame memory for the image data to be up scaled in the vertical direction.
Figure 3:
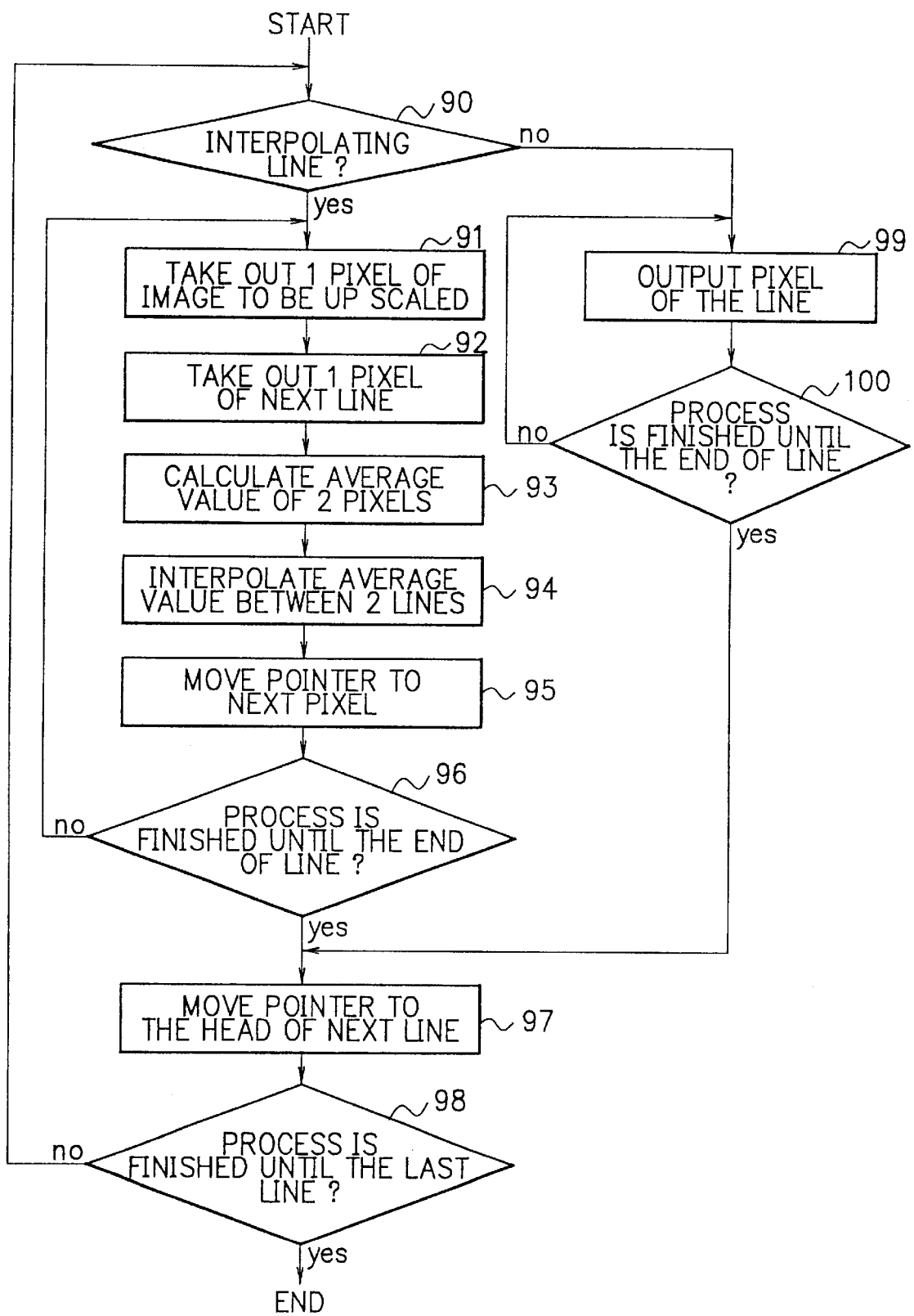
FIG. 3 is a flowchart showing the up scale process of the conventional type.

Referring now to the drawings, embodiments of the present invention are explained in detail. FIG. 4 is a block diagram showing a first embodiment of the present invention. In FIG. 4, a data processor 52 is constituted of a frame memory 81 to which a background image 71 is inputted, a frame memory 82 to which a superimposing image 72 is inputted, a display pixel selecting section 54 which selects either the pixel value read from the frame memory 81 or the pixel value read from the frame memory 82 according to a display synchronizing signal and an address signal to read the frame memory and a display processing section 84 which generates a display signal and displays on a display 53 according to the pixel value selected at the display pixel selecting section 54.

At the a blending processor in FIG. 1, the background image is multiplied by (1−α) and the superimposing image is multiplied by α and the multiplied results are added and the added value is written in the frame memory for display 23. However, in the processor of the present invention, either the background pixel or the superimposing pixel is chosen at the display pixel selection section 54 and chosen at the display pixel selecting section 54 and the chosen pixel is outputted to the display processing section 84. Therefore, the multiplying calculation at the multipliers 65 and 66 in FIG. 1 is not needed at the processor of the present invention.

The operation of the display pixel selecting section 54 is explained. FIG. 5 is a conceptual diagram showing an explanation of the superimposing of adjacent pixels in each display frame of the displaying image on the display 53. In this case, the explanation provided with reference to FIG. 5 is implemented in a non-interlace system. This example shows the semitransparent display by superimposing the superimposing image of the frame memory 82 on the background image of the frame memory 81 with the color blending factor 3 to 1.

Referring to FIG. 5, the display pixel selection section 54 divides the display image which is in the range of the image superimposed into the unit of 2×2 pixels and selects the pixel value of the superimposing image read from the frame memory 82 for 3 pixels and the pixel value of the background image read from the frame memory 81 for the remaining 1 pixel. In this case, in the unit of 2×2 pixels, the coordinate selected for the background pixel is changed in sequence in the circulation in each display frame according to the synchronizing timing (T=0 to 3) of the display as shown in FIG. 5. According to the chosen pixel value, the display signal generated at the display processing section 84 is displayed on the display 53. As explained above, a semitransparent image which is fully naturally color blended in appearance and in time and space can be obtained.

In order to select the pixel value as mentioned above, in the display pixel selecting section 54, for example, a selector which selects either output from the frame memory 81 or the frame memory 82 according to the combination (x, y) of each LSB (least significant bit) of the XY address reading the frame memory is provided. Alternatively, as a more desirable method, a gate which supplies the XY address reading the frame memory to only either one frame memory of the frame memories is provided according to the combination (x, y) of LSB. With this, the selection of the pixel value can be easily realized with a small processing load.

FIG. 6 is a flowchart showing a selecting process of the pixel value. In order to start displaying, a timing T is initialized (step 31). Confining the timing in each display frame at the display pixel selecting step (step 32), when T=0 (step 33-0) and the combination of the LSB of the XY address reading the frame memory is (0, 0), the background pixel of the frame memory 81 is selected and the superimposing pixel of the frame memory 82 is selected at the other XY addresses reading the frame memory. As shown above, the image of one fame is processed (step 34). After this, the timing T is incremented from 0 to 3 in the cycle (step 35). With this operation, at T=1, LSB=(1, 0), (step 33-1),
at T=2, LSB=(1,1) (step 33-2), and
at T=3, LSB=(0, 1), (step 33-3), the background pixel of the frame memory 81 is selected as the pixel value of the above address, and the superimposing pixel of the frame memory 82 is selected at the other addresses. With this operation, the semitransparent superimposing can be implemented with the color blending factor 3 to 1 for the superimposing image to the background image as shown in FIG. 5.

Figure 7:
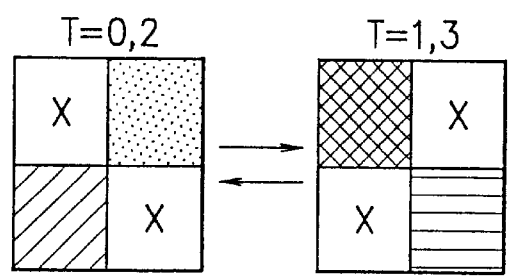
FIG. 7 is a conceptual diagram showing an example of the superimposing of an image in each display frame of adjacent pixels to the image displayed on the display in FIG. 4.

And in the following case,
at T=0, 2, LSB=(0, 0) and (1, 1), and
at T=1, 3, LSB=(1, 0) and (0, 1), the background pixel of the frame memory 81 is selected at the above addresses and the semitransparent superimposing can be implemented with the color blending factor 1 to 1 for the superimposing image to the background image as shown in FIG. 7.

Figure 8:
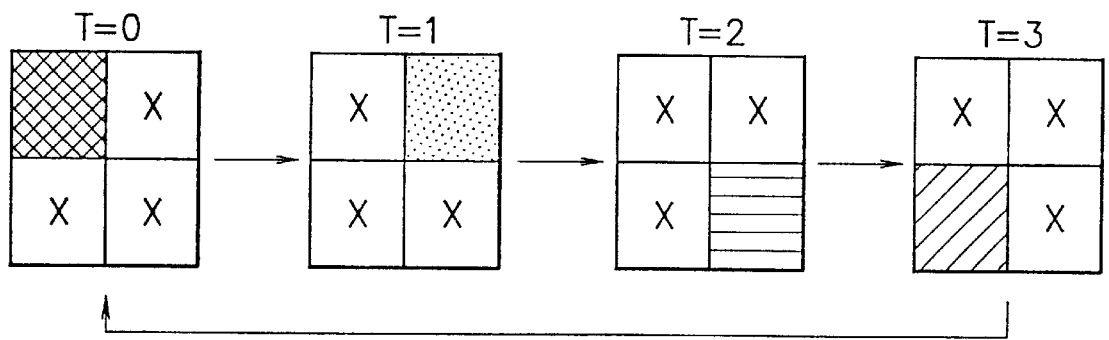
FIG. 8 is a conceptual diagram showing another example of the superimposing of an image in each display frame of adjacent pixels to the image displayed on the display in FIG. 4.

Moreover, in the following case,
at T=0, LSB=(1, 0), (1, 1), (0, 1),
at T=1, LSB=(1, 1), (0, 1), (0,0),
at T=2, LSB=(0, 1), (0,0) (1, 0), and
at T=3, LSB=(0, 0), (1,0), (1, 1), the background pixel of the frame memory 81 is selected at the above addresses and the semitransparent superimposing can be implemented with the color blending factor 1 to 3 for the superimposing image to the background image as shown in FIG. 8.

Furthermore, for example, at the display pixel selecting section 54, referring to the least two bits of the XY address, by selecting some pixel values to be 3×3 or 4×4 in a similar manner in the cycle, the semitransparent superimposing can be implemented with a color blending factor of 10 ways or 17 ways including 0% to 100%, respectively.

In the above example, the number of pixels selected from the superimposing image is fixed. However, by selecting a suitable number of pixels in each timing (display frame), the steps of the color blending factor can be further increased.

In the data processor 52 in FIG. 4, the display pixel selecting section 54 selects the display pixel from the frame memory 81 of the background image and the frame memory 82 of the superimposing image according to the XY address. However, the present invention is not limited to this construction. For example, the display pixel selecting section 54 operates such that at the time when the superimposing image 72 is written into the frame memory 82, only the selected superimposing image is written into the frame memory 82 in each timing (display frame) as mentioned above, and the display processing section 84 is also able to produce a composite display overwriting the pixel data of the frame memory 82 onto the frame memory 81. Further, the plural frame memories corresponding to each timing are provided in the frame memory 82, the display pixel selecting section 54 only develops the superimposing pixel to be selected at each respective timing and the display processing section 84 selects one of the plural frame memories 82 in sequence at each timing (display frame), and is also able to generate a composite display overwritten onto the frame memory 81.

Figure 9:
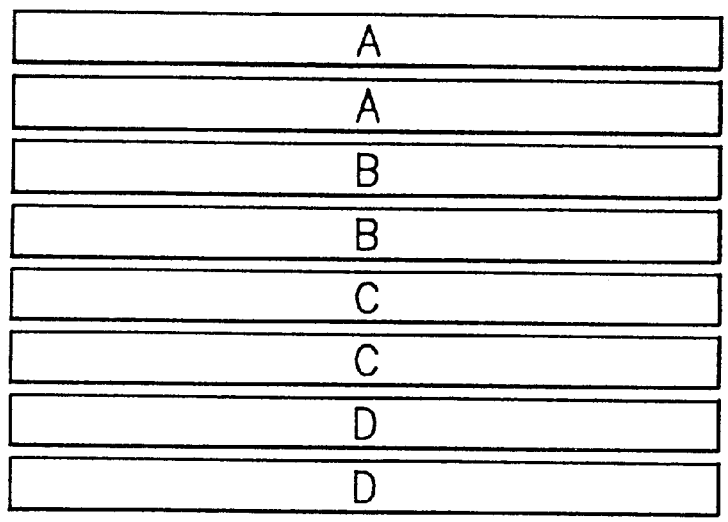
FIG. 9 is a conceptual diagram showing an up scaled display screen at one timing.
Figure 10:
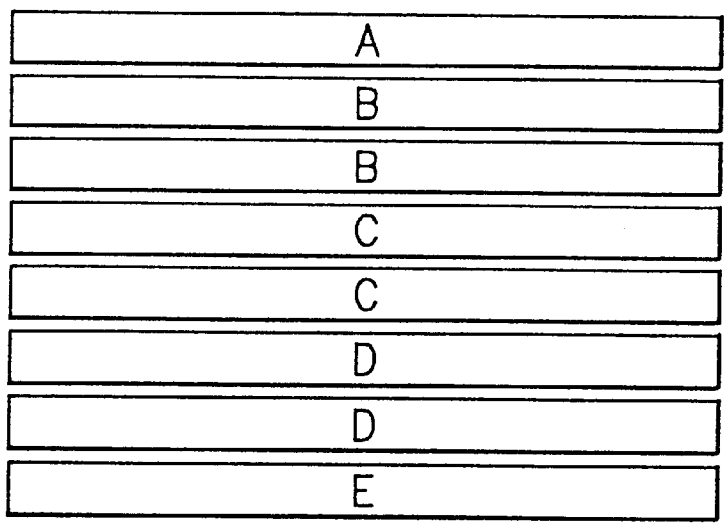
FIG. 10 is a conceptual diagram showing another up scaled display screen at one timing.

Next, a second embodiment of the image color blending processor of the present invention is explained. For example, in FIG. 4, in the case in which the image stored into the frame memory 81 is up scaled to be twice as large in the vertical direction and is displayed, the conventional up scale display processor displays by calculating the linearly interpolated value of the pixel value of the lines above and below the interpolation line of the up scaled display image. However, in the image color blending processor of the present invention, the display pixel selecting section 54 refers to a Y address of the display image and for an even line (interpolating line), for example, at the timing (display frame) T=0, each pixel value of the line right before is selected and is read from the frame memory 81, and the image shown in FIG. 9 is displayed. At the timing T=1, each pixel value of the line right after is selected and is read from the frame memory 81, and the image shown in FIG. 10 is displayed.

With this operation, by circulating the timing 0 and 1 at each display frame, as with the first embodiment, the interpolated line resulting from the linear interpolation (to be averaged) can be smoothly displayed in appearance and in the time and space.

In the above explanation, the image is up scaled to be twice as large in the vertical direction. However, for example, in the case in which the two interpolation lines each are inserted and the 300% up scale in the vertical direction is implemented, the timing is cycled from T=0 to 2 synchronized with the display frame, expressing the pixel value of the line right above the interpolating line ("above") and the pixel value of the line right after the interpolating line ("below"), and the respective interpolating lines are expressed as follows:

at T=0, above, above,
at T=1, above, below, and
at T=2, below, below.

With this expression, for the two interpolation lines, without needing the multiplication process as necessary with the a blending, the interpolating line provides a smooth pixel value and is interpolated from the pixel value of the lines above and below. In this manner, semitransparency of two images in the ratio of 2 to 1 and 1 to 2 is achieved using the linear interpolation method.

If the image is up scaled in the horizontal direction in the operation mentioned above, the pixel values before and after the X address of the frame memory 81 in each timing (display frame) is interpolated and expressed in the cycle. With this operation, a naturally-appearing up scaled image is easily obtained. Using a combination of the above mentioned embodiments, without needing the multiplication process having a large process burden, the up scaled image in the vertical and horizontal directions can be displayed without losing a natural appearance.

As is clear from the explanation mentioned above, the present invention is able to provide a semitransparent display of images without needing the multiplication process which places a big burden on the processor and is able to provide the effect of interpolation without needing an interpolating calculation of the pixels in the line which otherwise would be interpolated for the up scale display of images. Therefore, according to the present invention, even a relatively small processor can implement an image processing such as semitransparent superimposition, and can provide an image up scale at high speed and with high quality.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image color blending processor which displays an image in which a second original image is superimposed semitransparently on a first original image, comprising:

a display pixel selecting section which divides a display image into plural small regions constituted of a definite number of pixels adjacent to each other, wherein each small region is associated with a display frame, wherein the display pixel selection section further sequentially and cylically selects pixel data of at least one pixel from each of said small regions of said first original image along with pixel data of a remaining number of pixels from each of said small regions of said second original image at a defined rate, and wherein the sum of the number of pixels selected from the first original image and the number of pixels selected from the second original image in each frame equal the total number of pixels in the frame, and the pixels selected from the first original image have different positions in the corresponding frame from the pixels selected from the second original image at any given time; and a display processing section which generates a display image signal based on the pixel data selected at said display pixel selecting section.

2. An image color blending processor in accordance with claim 1, wherein:

said small region is constituted of at least 4 pixels adjacent to one another.

3. An image color blending processor in accordance with claim 1, comprising:

a first frame memory for storing said first original image, a second frame memory for storing said second original image, and a timing counter for outputting a counting value of from 0 to 3 by synchronizing each increment with a vertical synchronizing signal of said display image.

4. An image color blending processor in accordance with claim 3, wherein:

said display pixel selecting section selects pixel data corresponding to either a display address of said first frame memory or a display address of said second frame memory, according to a combination of respective LSB (least significant bit) values in which the X address and Y address of said display addresses are expressed as a binary digit and said counting value, at the superimposing display region.

5. An image color blending processor which displays an original image up scaled by interpolating a definite number of pixels in the vertical direction or horizontal direction, or both the vertical and horizontal directions between the pixels of the original image, comprising:

a display pixel selecting section which divides the upscaled image into a plurality of display frames each having a plurality of pixels and a display address, and sequentially selects pixel data of the pixels of the original image displayed in the nearest address to the right and left and above and below a selected pixel, as the respective pixels to be interpolated, at a defined rate, by making the average time of the respective pixels change smoothly in the space between the pixels of said original image adjacent to pixels to be interpolated, and a display processing section which generates a display image signal based on the pixel data selected at the display pixel selecting section.

6. An image color blending processor in accordance with claim 5, wherein:

said up scaled display image is 200% up scaled in the vertical direction such that one line of pixels of the original image data is interpolated into two lines in the vertical direction, and said display selecting section selects alternately the pixel data of an interpretation line from the pixel data of said original image in a line displayed right above said interpolation line and right below said interpolation line each display frame.

* * * * *